United States Patent
Ferrer et al.

(10) Patent No.: US 6,700,965 B1
(45) Date of Patent: Mar. 2, 2004

(54) IDENTIFIER-TRIGGERED PERSONALIZED CUSTOMER RELATIONS MANAGEMENT SERVICE

(75) Inventors: Juan dela Cruz Ferrer, Princeton Junction, NJ (US); William F. Wright, Union, NJ (US)

(73) Assignee: AT&T Corp., New York, NY (US)

( * ) Notice: Subject to any disclaimer, the term of this patent is extended or adjusted under 35 U.S.C. 154(b) by 52 days.

(21) Appl. No.: 10/137,301

(22) Filed: May 3, 2002

(51) Int. Cl.[7] ............................................. H04M 3/42
(52) U.S. Cl. ........................... 379/201.02; 379/207.15
(58) Field of Search ..................... 379/201.02, 207.15, 379/207.14, 88.2

(56) References Cited

U.S. PATENT DOCUMENTS

| | | | |
|---|---|---|---|
| 4,799,156 A | * | 1/1989 | Shavit et al. .................. 705/26 |
| 5,367,454 A | | 11/1994 | Kawamoto et al. |
| 5,537,470 A | | 7/1996 | Lee |
| 5,894,512 A | | 4/1999 | Zenner |
| 6,279,038 B1 | | 8/2001 | Hogan et al. |
| 6,334,103 B1 | | 12/2001 | Surace et al. |
| 2002/0029190 A1 | * | 3/2002 | Gutierrez-Sheris |

* cited by examiner

Primary Examiner—Creighton Smith
(74) Attorney, Agent, or Firm—Banner & Witcoff, Ltd.

(57) ABSTRACT

A method and a system for utilizing an interactive identity for an automated transaction are disclosed. User identification information is received. A pre-selected identity that is associated with the user identification information is retrieved. The pre-selected identity is utilized for interaction with a user for an automated transaction. The pre-selected identities can be stored in a database indexed by user identification information. In an exemplary embodiment of the present invention, selectable options for identities are provided to the user and the selected options form the basis for determination of a pre-selected identity for the user. The pre-selected identity can be one of an audio-based, a video-based, and a multimedia-based identity.

43 Claims, 4 Drawing Sheets

IDENTIFIER-TRIGGERED PERSONALIZED CUSTOMER RELATIONS MANAGEMENT SERVICE

BACKGROUND OF THE INVENTION

1. Field of the Invention

The invention relates to telecommunications systems. More particularly, the present invention relates to a method and system for customer specification of response service.

2. Background of the Related Art

In today's customer relations management services environment, many enterprises have deployed mechanized Customer Relationship Management (CRM) services/systems to lower costs by avoiding staffing live customer agents. CRM services/systems generally refer to the transaction of business or information by a telecommunications medium and typically involve a CRM provider capable of simultaneously handling a number of incoming calls, requests, inquiries, etc. Enterprises deploying mechanized CRM services/systems often use either male or female voices for interacting with their customers. A CRM service/system puts hardware, software, and networking in place that improves a supplier's/distributor's/seller's relationships/dealings with customers. Exemplary CRM service/system providers can be included in any industry, such as airline, hotel, and car reservation systems, restaurant, tourism, and credit card systems, and even small business industries. The application of a mechanized service/system for customer service in any industry, business, or entity is increasing as the number of humans interacting with computer systems grows greater every day.

In a simple example, a customer might like to be able to access a supplier's package tracking system, so the customer can find out whether packages were shipped, when the packages were shipped, and where the packages are currently. During the process of accessing the package tracking system, the customer receives a mechanized greeting in a particular voice spectrum, for example, in a female voice or male voice. Customers calling a conventional CRM service/system, however, are left with no option as to the particular voice spectrum used by the CRM service/system provider. When the mechanized CRM service/system utilizes a female voice, all customers receive the same voice during a transaction.

Further, when the mechanized voice, whether male or female, interacts with a customer in a manner that is not pleasing to the customer's ear, the customer must choose to remain with the dispensing voice with which to interact, find another way for obtaining the desired service, or find an entirely different provider. For example, consider a customer calling a clothing distributor to obtain a shirt of a certain type, color, and size. In the case when a mechanized voice is dispensing to the customer, the customer only has the option of remaining on the line and completing the transaction with the displeasing voice, attempting to obtain the desired shirt by another manner, such as through the clothing distributor's online retail store, or disconnecting and trying a different clothing distributor altogether.

Systems exist for utilizing the Automatic Number Identification (ANI), the Calling Line Identification (CLI), or the Mobile Identification Number (MIN), as a trigger for certain network/service actions such as network routing, call distribution, language handling, etc. For example, U.S. Pat. No. 5,537,470 to Lee relates to a method and apparatus that uses the ANI of a caller to route a call to a specific agent who previously handled a call from the same ANI. Nevertheless, the Lee system does not allow a customer/caller to choose a preferred mechanized voice spectrum or a preferred interactive video response choice from a plurality of options.

U.S. Pat. No. 6,279,038 to Hogan et al. relates to a call processing system and method that provides a wide range of enhanced calling products and features to subscribers. The call processing system is implemented to provide system flexibility and to offer users the option of choosing the level and types of features, products and services they receive. The Hogan et al. system, however, does not allow a customer/caller to choose a preferred mechanized voice spectrum or a preferred interactive video response choice from a plurality of options.

U.S. Pat. No. 6,334,103 B1 to Surface et al. relates to a method that includes executing a voice user interface and controlling the voice user interface to provide voice user interface with a personality. The Surface et al. method, however, does not allow a customer/caller to choose a preferred mechanized voice spectrum or a preferred interactive video response choice from a plurality of options based upon user identification information.

What is needed is a technique that allows a user to choose a preferred mechanized voice spectrum from a plurality of options and a technique that allows a user to choose a preferred interactive video response choice from the plurality of options based upon user identification information. As used herein, the term user is defined to include customer and caller.

BRIEF SUMMARY OF THE INVENTION

The present invention provides a technique that allows a user to choose a preferred mechanized voice spectrum from a plurality of options. The present invention also provides a technique that allows a user to choose a preferred interactive video response choice from a plurality of options.

The advantages of the present invention are provided by a method and a system for utilizing the ANI/MNI/CLI or other form of identification (such as an account number) of a user as a pointer/index to an identity of a preferred mechanized voice spectrum of a user that the CRM platform of a service provider would use to handle the call of the user. The identity of the preferred voice spectrum could be based on gender, age, language, public personalities, appearance, audio fidelity, or combinations thereof for distinguishing a particular voice spectrum.

According to one aspect of the present invention, the method/system allows a user to pre-select a preferred voice spectrum choice and have the system store the selection in a database for future transactions. Additionally, an exemplary method/system of the present invention allows the user to specify an on-demand choice among a list of options at the time of the call.

According to another aspect of the invention, the method/system utilizes the ANI/MNI/CLI or other form of identification (such as an account number) of a user as a pointer/index to an identity of a preferred mechanized video response choice of a user that the CRM platform of a service provider would use to handle the multimedia call of the user. The identity of the preferred video response choice could be based on gender, age, language, public personalities, animation, appearance, humor, audio fidelity, video fidelity, or combinations thereof for distinguishing a particular video response choice.

Yet another aspect of the present invention provides for storage of the pre-selected user-preferred video response choice in a database for future transactions. Additionally, an exemplary method/system of the present invention allows a user to specify an on-demand choice among a list of options at the time of the call.

According to another aspect of the present invention, the method/system utilizes an Internet Protocol Address (IPA) or other form of identification of a user as a pointer/index to an identity of a user-preferred mechanized voice spectrum choice that a CRM platform of a service provider would use to handle the transaction of the user. One such application is by use of a service provider for an online customer purchase catalogue. The exemplary method/system allows the user to choose a voice spectrum for audio commentary and/or direction during the online transaction from a plurality of options. Again, the identity of the preferred voice spectrum choice could be based on gender, age, language, public personalities, humor, audio fidelity, or combinations thereof for distinguishing a particular voice spectrum.

Further still, yet another aspect of the present invention provides for storage of the pre-selected user-preferred voice spectrum choice in a database for future transactions on an online catalogue, Internet website, or other interactive audio- and/or video-enabled application of a service provider. Additionally, the exemplary method/system allows the user to specify an on-demand choice among a list of options at the time of a transaction.

According to another aspect of the present invention, an exemplary method/system utilizes an Internet Protocol Address (IPA) or other form of identification of a user as a pointer/index to an identity of a preferred mechanized video response choice of a user that a CRM platform of a service provider would use to handle the transaction of a user. The identity of the preferred video response choice could be based on gender, age, language, public personalities, animation, appearance, humor, audio fidelity, video fidelity, or combinations thereof for distinguishing a particular video response choice.

Yet another aspect of the present invention provides for storage of the pre-selected user-preferred video response choice in a database for future transactions on an online catalogue, Internet website, or other interactive audio and/or video enable application of a service provider. Additionally, an exemplary method/system allows a user to specify an on-demand choice among a list of options at the time of the transaction.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

As used herein, the term "identity" may also include the following terms: character, attribute, feature, quality, personality, classification, designation, and categorization.

One aspect of the present invention provides a way for a user to choose a preferred mechanized voice spectrum from a plurality of options. Another aspect of the present invention provides a way for a user to choose a preferred interactive video response choice from a plurality of options. According to one embodiment of the invention, an ANI, MNI, CLI, or IPA of a user is determined and utilized to identify a pre-selected user-preferred mechanized voice spectrum or interactive video response choice that the CRM platform would use to interact with the user. That is, when a user interfaces a CRM service/system, a form of identification unique to the user triggers a pre-selected identity. An alternative embodiment of the present invention provides that a user can specify a choice of an identity with which to interact on-demand among a list of options.

For each of these embodiments, the voice spectrum is generated from a text-based file using text-to-speech (TTS) technology, such as the Next-Generation TTS system, the Natural Voices™ engine, and the How May I Help You!$^{SM}$ service, each available from AT&T Corp. Further, the video response choices are generated from an audio- and video-based file using visual text-to-speech (Visual TTS) technology, a synchronization of a facial image with synthesized speech. Examples include the Talking Heads technology, the Animated Head technology, the FlexTalk® TTS synthesizer, and the Next-Generation speech synthesizer, each available from AT&T Corp. Accordingly, the identity, determined by the selected voice spectrum or video response choice, may be selected based upon aural and/or visual preferences, such as gender, age, language, celebrity personality, animation, appearance, humor, audio fidelity, video fidelity, or combinations thereof for distinguishing a particular voice spectrum or video response choice.

Figure 1:
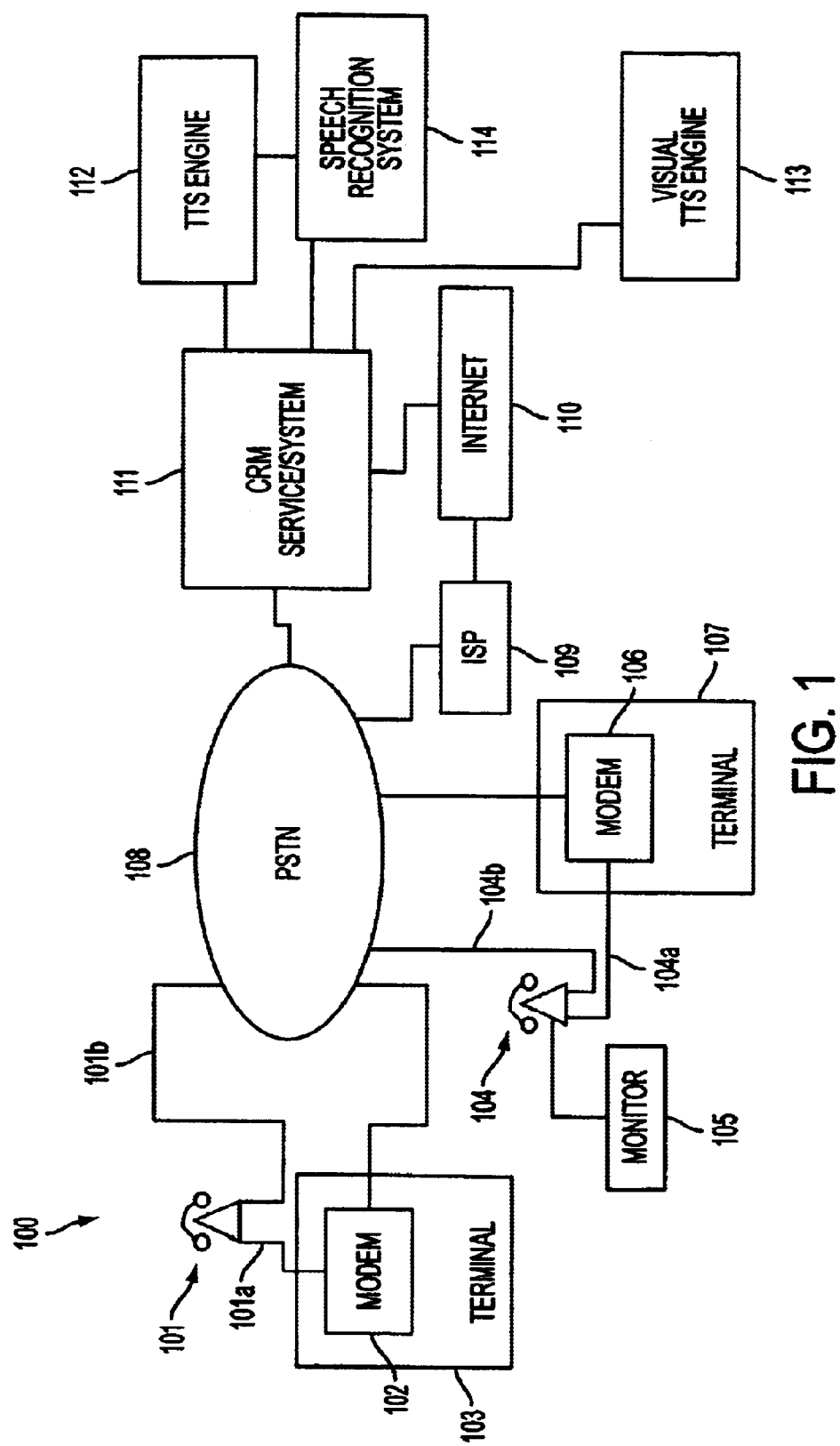
FIG. 1 shows a block diagram of an exemplary communications network incorporating a customer relations management (CRM) service/support according to the present invention.

FIG. 1 shows a block diagram of an exemplary communications network 100 incorporating a customer relations management (CRM) service/system 111 according to the present invention. In FIG. 1, a first telecommunications terminal 103 is connected to a public switch telephone network (PSTN) 108 in a well-known manner, such as by a connection through a modem 102. A telephone 101 is connected to PSTN 108 through modem 102 in a well-known manner, as shown by connection 101a. Additionally, telephone 101 can be connected directly to PSTN 108 in a well-known manner, as shown by connection 101b. A second telecommunications terminal 107 is connected to PSTN 108 in a well-known manner, such as by a connection through a modem 106. A multimedia telephone 104 is connected to PSTN 108 through a modem 106 in a well-known manner, as shown by connection 104a. Additionally, multimedia telephone 104 can be connected directly to PSTN 108 in a well-known manner, as shown by connections 104b. Multimedia telephone 104 includes a monitor 105. For this configuration, both terminals 103 and 107 are preferably personal computers (PCs). Network-based CRM service/system 111 is connected to PSTN 108 and to a computer network 110, such as the Internet, in a well-known manner. An Internet Service Provider (ISP) 109 is also connected between PSTN 108 and the Internet 110 in a well-known manner.

While only two terminals 103 and 107 and two telephones 101 and 104 are shown, it should be understood that a plurality of terminals and telephones could be connected to PSTN 108. Moreover, the connections between the terminals and PSTN 108 and the telephones and PSTN 108 can be wireline connections or wireless connections. The particular network components necessary for either type of connections are not shown for simplicity. Further, although FIG. 1 illustrates an application involving a PSTN, other telecommunication networks could be substituted for or coupled with a PSTN. Such other telecommunication networks include a broadband (e.g., ATM) network, a cellular/digital personal communication services (DPCS) network, a satellite network, a cable television network, a Voice Over Data Protocol (e.g., Voice Over Internet Protocol—VOIP, Voice Over Frame Relay—VOFR, Voice Over Asynchronous Transfer Mode—VOATM) network, a Video Over Data Protocol network, a data network, and/or a Signaling System 7 (SS7) network. It is to be understood that the present invention can be applied to all types of communications systems. Also, a multitude of communications devices can be employed with the present invention, including, but not limited to, personal and laptop computers, mobile communication units, pagers, wireline telephones, televisions, and videophones.

While only one ISP (e.g., ISP 109) is shown in FIG. 1, it should be understood that a plurality of ISPs could be connected between PSTN 108 and the Internet 110. Although CRM service/system 111 is shown as a separate network-based functionality, CRM service/system 111 can be provided by and be part of an ISP (not shown).

A text-to-speech (TTS) engine 112 is utilized by the CRM service/system 111 in order to conduct the interaction between a user and CRM service/system 111 based upon a voice spectrum. The CRM service/system 111 prompts and interacts with a user by utilizing the user's pre-selected or on-demand selected voice spectrum identity and the TTS engine 112. The TTS engine 112 converts machine-readable text for prompting and interacting with the user based upon the voice spectrum identity chosen. In the situation when TTS engine 112 is a Natural Voices™-based system, the user's pre-selected or on-demand selected Natural Voices™ voice spectrum identity is retrieved and used for playing the text for the prompting and interacting with the user.

A Visual TTS engine 113 is utilized by the CRM service/system 111 to conduct an interaction between the user and the CRM service/system 111 based upon the video response choice. The CRM service/system 111 prompts and interacts with a user by utilizing the user's pre-selected or on-demand selected video response identity and the Visual TTS engine 113. The Visual TTS engine 113 synchronizes a facial image, or talking head, with synthesized speech, i.e., speech generated from the interaction of the CRM service/system 111 and the TTS engine 112. Realistic mouth motions matching the speech sounds not only give the perception that the image is talking, but can actually increase the intelligibility of the speech. In the situation in which Visual TTS engine 113 is AT&T's Animated Head technology, the user's pre-selected or on-demand selected Animated Head video response identity is retrieved and used for playing the images for the prompting and interacting with the user. Potential applications for use are virtual telephone operators, virtual sales agents, email readers, personalized agent interfaces, virtual conferences, and chat rooms. AT&T's MPEG-4 technology includes the ability to allow animation of proprietary face models as well.

Text-to-speech (TTS) engine 112 could include or be supplemented by a speech recognition system 114 that allows a machine/system to understand spoken responses of a user and to determine what service the user wants, thereby conducting a dialog as necessary to gather further information. AT&T's How May I Help You!$^{SM}$ technology takes advantage of AT&T Labs' advances in large-vocabulary speech recognition, natural voice understanding, and dialogue control to shift the burden of understanding what a user wants from the user to the machine, greatly increasing a user's willingness to use it.

Figures 2A, 2B:
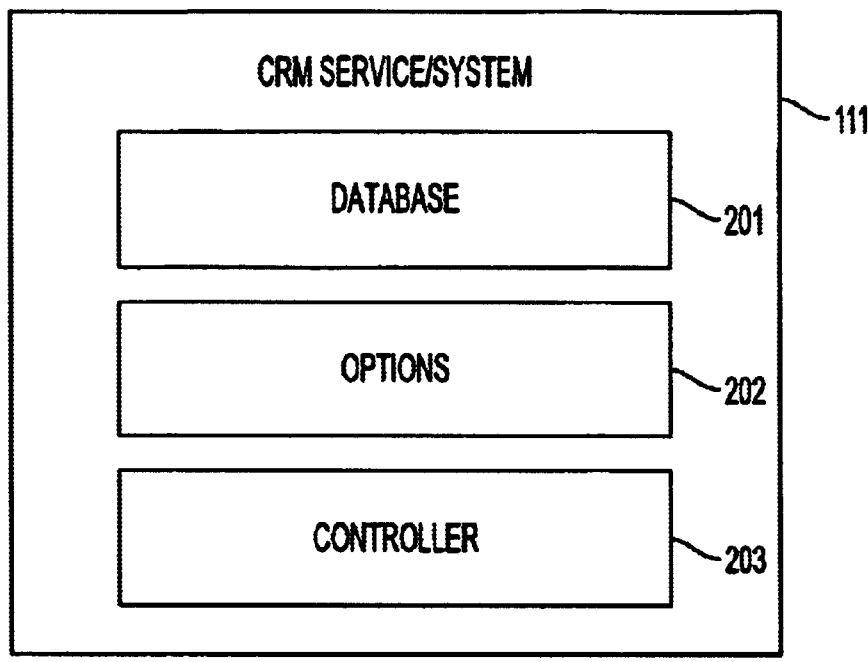
FIG. 2A shows a block diagram of an exemplary CRM service/system according to the present invention.
FIG. 2B shows a block diagram of an exemplary database according to the present invention.

FIG. 2A shows an exemplary arrangement of a CRM service/system, such as the CRM service/system 111 of FIG. 1. In one exemplary embodiment, the CRM service/server 111 includes a database 201 for storage of a pre-selected identity of a user. The database 201 can be indexed by an ANI/MNI/CLI/IPA or some other form of identification (such as an account number) of a user. Further, although illustrated within the CRM service/system 111 reference element in FIG. 2A, database 201 could be an independent storage area that is separate from the CRM service/system. The manner and configuration for storage are well known in the art.

In another exemplary embodiment, the CRM service/system 111 could include an options 202 element that is a compilation of a plurality of available identities and features of identities. Options 202 allows the selection of a user-preferred identity based upon aural and/or visual preferences, such as gender, age, language, celebrity personality, appearance, animation, humor, audio fidelity, video fidelity, or combinations thereof for distinguishing a particular voice spectrum or video response choice. In a further exemplary embodiment, options 202 element could be included within a independent from database 201.

In yet another exemplary embodiment, the CRM service/system could include a controller 203 element to administer the determination, utilization, and storage of user-preferred pre-selected identities. Controller 203 receives inputs specifying selection criteria from options 202 for an identity. Controller 203 further transmits outputs to determine whether pre-selected identities exist.

FIG. 2B shows an exemplary embodiment of a database for storage of user-preselected identities, such as the database 201 of FIG. 2A. In one exemplary embodiment, the database 201 includes a memory table 220 that is indexed by the identifier utilized by the CRM service/system. In this exemplary embodiment, the first column, reference element 240, lists all of the identifiers by the ANI of the user. For each ANI identifier within the first column 240, a pre-selected identity associated with the particular ANI identifier is listed in a second column 250. Therefore, for this example, ANI identifier 324-912-3344 is a pointer to identity 4A that has been pre-selected by the user associated with the ANI identifier. Table 220 represents but one exemplary way to store and index the present invention, and it should be noted that there are many other configurations well known in the art for accomplishing the same objective. For another example, the identity could be listed by a secondary code, a name of a celebrity personality, or simply a link to a secondary memory device maintaining all identities available.

Figure 3:
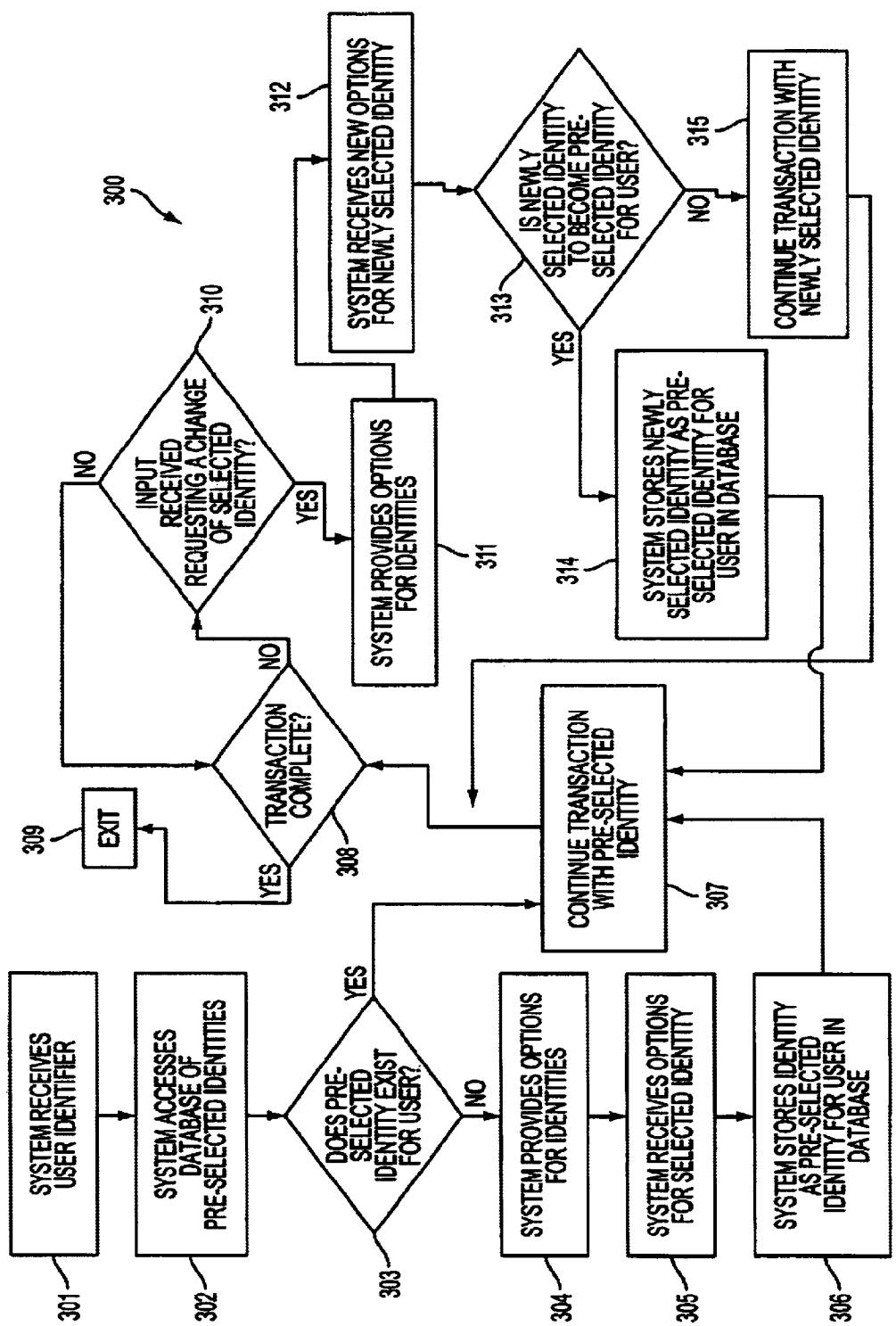
FIG. 3 shows a flow diagram for determining an identity for user interaction according to one embodiment of the present invention.

FIG. 3 shows a flow digram 300 for determining an identity for user interaction according to one exemplary embodiment of the present invention. At step 301, the CRM service/system receives a customer identifier, such as the ANI, MIN, CLI or IPA of the user. As previously mentioned, the user identifier could be more than one of the above-referenced identifiers. At step 302, the CRM service/system accesses, for example, database 201 containing pre-selected identities indexed by some form of user identification. At step 303, a determination is made whether a pre-selected identity exists for the user based upon the user identifier. If, at step 303, it is determined that a pre-selected identity for a user exists, flow continues to step 307 where the transaction with the user continues with the pre-selected identity. If, at step 303, it is determined that a pre-selected identity does not exist for the user, flow continues to step 304.

At step 304, the CRM service/system provides options 202 for existing identities and identity criteria for the user to choose from. A step 305, the CRM service/system receives selected option(s) in determining a pre-selected identity for the user. At step 306, the CRM service/system stores the identity, determined from the user-selected options, as the pre-selected identity for the user, for example, in database 201. Flow continues to step 307 where the transaction with the user continues with the pre-selected identity chosen by the user.

At step 308, it is determined whether the transaction is complete, such as an exemplary case where a user terminates a telephone transaction. If, a step 308, it is determined that the transaction is complete, flow continues to step 309 where the process exists. If, at step 308, it is determined that the transaction is not complete, flow continues to step 310.

At step 310, it is determined whether the CRM service/system has received an input requesting a change of the pre-selected identity. Such a request is an on-demand request. If, a step 310, it is determined that the CRM service/system did not receive an input requesting a change of the pre-selected identity, flow returns to step 308. If, at step 310, it is determined that the CRM service/system received an input requesting a change of the pre-selected identity, the flow continues to step 311. For the present example, an input requesting a change of the pre-selected identity is received by the CRM service/system.

At step 311, the CRM service/system provides options 202 for existing identities and identity criteria for the user to choose from. At step 312, the CRM service/system receives selected option(s) in determining a newly selected identity for the user. At step 313, it is determined whether the newly selected identity will be stored as the pre-selected identity for the user. If, a step 313, it is determined that the newly selected identity is to become the pre-selected identity for the user, the flow continues to step 314. If not, the flow continues to step 315 where the transaction continues with the newly selected identity for the user. For the present example, the newly selected identity is to become the pre-selected identity for the user, therefore proceeding to step 314.

At step 314, the CRM service/system stores the identity, determined from the user-selected options, as the pre-selected identity for the user in database 201. Flow returns to step 307 where the transaction with the user continues with the pre-selected identity chosen by the user. Because a new identity for the user has been stored in step 314, the identity becomes the pre-selected identity for the user for the next time the user interacts with the CRM service/system.

Figure 4:
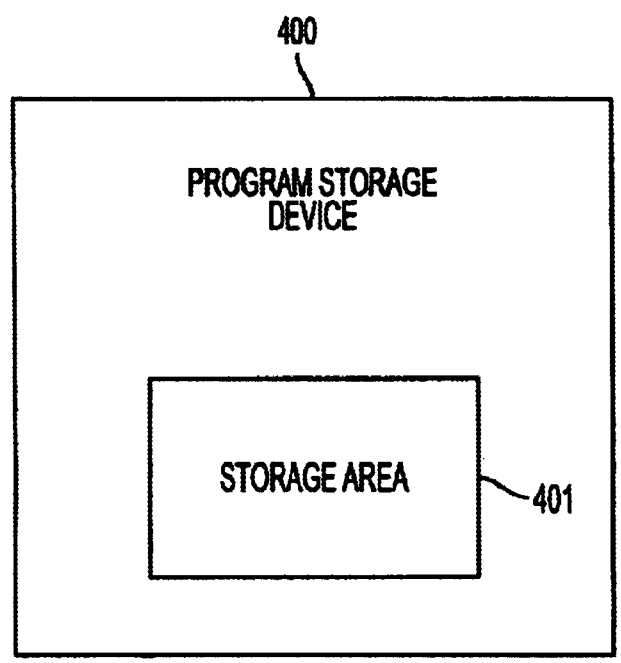
FIG. 4 shows a program storage device having a storage area for storing a machine-readable program of instructions that are executable by the machine for performing a method of the present invention determining an identity for user interaction according to the present invention.

FIG. 4 shows a program storage device 400 having a storage area 401 for storing a machine-readable program of instructions that are executable by the machine. Information stored in storage area 401 is in a well-known manner that is readable by a machine, and that tangibly embodies a program of instructions executable by the machine for performing the method of the present invention described herein for performing a method of the present invention determining an identity for user interaction. Program storage 400 can be a magnetically recordable medium device, such as a magnetic diskette or hard drive, or an optically recordable medium device, such as an optical disk.

While the invention has been described with respect to specific examples including presently preferred modes of carrying out the invention, those skilled in the art will appreciate that there are numerous variations and permutations of the above described system and techniques that fall within the spirit and scope of the invention as set forth in the appended claims.

What is claimed is:

1. A method for utilizing an interactive identity for an automated transaction, the method comprising steps of:
   receiving user identification information;
   retrieving a pre-selected identity that is associated with the user identification information receiving at least one selected option for a newly selected identity, wherein the newly selected identity is one of an audio-based, video-based, and a multimedia-based identity;
   utilizing the newly selected identity for interaction with a user for an automated transaction.

2. The method according to claim 1, wherein the user identification information is a one of an Automatic Number Identification (ANI), a Mobile Identification Number (MIN), a Calling Line Identification (CLI), and an Internet Protocol Address (IPA).

3. The method according to claim 1, wherein the step of retrieving includes steps of:
   accessing a database of pre-selected identities; and
   determining whether the user identification information is associated with a pre-selected identity.

4. The method according to claim 3, wherein the database of pre-selected identities is indexed by user identification information.

5. The method according to claim 4, wherein the database of pre-selected identities includes a list of a plurality of user identification information with associated pre-selected identities.

6. The method according to claim 3, wherein when the user identification information is not associated with a pre-selected identity, the method further comprising steps of:
   providing at least one selectable option for identities;
   receiving at least one selected option for an identity; and
   storing the identity as a pre-selected identity associated with the user identification information, the pre-selected identity being based upon the selected option.

7. The method according to claim 6, wherein the selectable option is one of a plurality of available identities.

8. The method according to claim 6, wherein the selectable option is one of a plurality of available features associated with the automated transaction.

9. The method according to claim 8, wherein the selectable option is one of gender, age, language, public personality, appearance, animation, humor, audio fidelity, video fidelity, and a combination thereof for the pre-selected identity.

10. The method according to claim 1, further comprising steps of:
    receiving an input requesting a new identity;
    providing at least one selectable option for new identities;
    receiving at least one selected option for a newly selected identity; and storing the newly selected identity as a pre-selected identity associated with the user identification information.

11. The method according to claim 1, wherein the pre-selected identity is one of an audio-based, a video-based, and a multimedia-based identity.

12. The method according to claim 1, wherein the step of utilizing the pre-selected identity further includes steps of:
   receiving a request relating to the automated transaction from the user; and
   providing a response to the request using the pre-selected identity.

13. The method according to claim 12, wherein the response is at least one of a speech signal and a video signal.

14. The method according to claim 13, further comprising a step of generating the speech signal from a text-based file using a text-to-speech engine.

15. The method according to claim 13, further comprising a step of generating the video signal from a vide-based file using a visual text-to-speech engine.

16. The method according to claim 12, wherein when a response cannot be provided, the method further comprising steps of:
   requesting additional information from the user;
   receiving a response containing additional information from the user; and
   providing a response based upon the received additional information using the pre-selected identity.

17. The method according to claim 16, wherein the additional information is at least one of a speech signal and a video signal.

18. The method according to claim 17, further comprising a step of generating the speech signal from a text-based file using a text-to-speech engine.

19. The method according to claim 17, further comprising the step of generating the video signal from a video-based file using a visual text-to-speech engine.

20. The method utilizing an interactive identity for an automated transaction, the system comprising:
   a receiver receiving user identification information from a user receiving at least one selected option for a newly selected identity, wherein the newly selected identity is one an audio-based, video-based, and a multimedia-based identity;
   a controller retrieving a pre-selected identity that is associated with the user identification information utilizing the newly selected identity for interacting with the user associated with the user identification information for an automated transaction.

21. The system according to claim 20, wherein the user identification information comprises one of an Automatic Number Identification (ANI), a Mobile Identification Number (MIN), a Calling Line Identification (CLI), and an Internet Protocol Address (IPA).

22. The system according to claim 20, wherein the controller accesses a database of pre-selected identities and determines whether the user identification information is associated with the pre-selected identity.

23. The system according to claim 22, wherein the database of pre-selected identities is indexed by user identification information.

24. The system according to claim 23, wherein the database of pre-selected identities comprises a list of a plurality of user identification information with associated pre-selected identities.

25. The system according to claim 22, wherein when the controller determines the user identification information is not associated with a pre-selected identity, the controller provides at least one selectable option for identities, the receiver receives at least one selected option for an identity, and the database of pre-selected identities stores the identity as a pre-selected identity associated with the user identification information, the pre-selected identity being based upon the selected option.

26. The system according to claim 25, wherein the selectable option is one of a plurality of available identities.

27. The system according to claim 25, wherein the selectable option is one of a plurality of available features for the automated transaction.

28. The system according to claim 27, wherein the selectable option is one of gender, age, language, public personality, appearance, animation, humor, audio fidelity, video fidelity, and a combination thereof for the pre-selected identity.

29. The system according to claim 20, further comprising:
   the receiver receiving an input requesting a new identity;
   the controller providing at least one selectable option for new identities;
   the receiver receiving at least one selected option for a newly selected identity; and
   a database of pre-selected identities storing the newly selected identity as a pre-selected identity associated with the user identification information.

30. The system according to claim 20, further comprising:
   the receiver receiving an input requesting a new identity;
   the controller providing at least one selectable option for new identities;
   the receiver receiving at least one selected option for a newly selected identity; and
   the controller utilizing the newly selected identity for interaction with the used for the automated transaction.

31. The system according to claim 30, wherein the newly selected identity is one of an audio-based, a video-based, and a multimedia-based identity.

32. The system according to claim 20, wherein the pre-selected identity is one of an audio-based, a video-based, and a multimedia-based identity.

33. The system according to claim 20, further comprising:
   the receiver receiving a request relating to the automated transaction from the user; and
   the controller providing a response to the request using the pre-selected identity.

34. The system according to claim 33, wherein the answer is at least one of a speech signal and a video signal.

35. The system according to claim 34, further comprising a text-to-speech engine generating the speech signal from a text-based file.

36. The system according to claim 34, further comprising a visual text-to-speech engine generating the video signal from a video-based file.

37. The system according to claim 33, wherein when a response cannot be provided, the system further comprising:
   the controlling requesting additional information from the user;
   the receiver receiving a response containing additional information from the user; and
   the controlling providing a response based upon the received additional information using the pre-selected identity.

38. The system according to claim 37, wherein the additional information is at least one of a speech signal and a video signal.

39. The system according to claim 38, further comprising a text-to-speech engine generating the speech signal from a text-based file.

40. The system according to claim 38, further comprising a visual text-to-speech engine generating the video signal from a video-based file.

41. The computer-readable medium containing computer-readable instructions for utilizing an interactive identity for an automated transaction, comprising steps of:

receiving user identification information;

retrieving a pre-selected identity that is associated with the user identification information receiving at least one selected option for a newly selected identity, wherein the newly selected identity is one of an audio-based, video-based, and a multimedia-based identity;

utilizing the pre-selected identity for interaction with a user for an automated transaction.

42. The computer-readable medium according to claim 41, wherein the step of retrieving includes steps of:

accessing a database of pre-selected identities; and determining whether the user identification information is associated with a pre-selected identity.

43. The computer-readable medium according to claim 42, wherein when the user identification information is not associated with a pre-selected identity, the method further comprising steps of:

providing at least one selectable option for identities;

receiving at least one selected option for an identity; and storing the identity as a pre-selected identity associated with the user identification information, the pre-selected identity being based upon the selected option.

\* \* \* \* \*

UNITED STATES PATENT AND TRADEMARK OFFICE
CERTIFICATE OF CORRECTION

PATENT NO. : 6,700,965 B1  
DATED : March 2, 2004  
INVENTOR(S) : Juan dela Cruz Ferrer et al.

Page 1 of 1

It is certified that error appears in the above-identified patent and that said Letters Patent is hereby corrected as shown below:

Column 10,  
Line 35, "used" has been replaced with -- user --;  
Line 58, "controlling" has been replaced with -- controller --;  
Line 62, "controlling" has been replaced with -- controller --.

Signed and Sealed this

Thirty-first Day of August, 2004

JON W. DUDAS  
*Director of the United States Patent and Trademark Office*